June 13, 1967 D. L. LILLY ET AL 3,325,632

DATA STORAGE TECHNIQUES

Filed July 12, 1961 4 Sheets-Sheet 1

SOLID COATED OXIDE

STRIPED OXIDE

STRIPED OXIDE & SCUFF OVERLAY

STRIPED OXIDE & EMBOSSED SCUFF TRACK

INVENTOR.
DONALD L. LILLY
BY MICHAEL E. MIKRUT
F. C. Sullivan
ATTORNEY

INVENTOR.
DONALD L. LILLY
BY MICHAEL E. MIKRUT
F. P. Sullivan
ATTORNEY

INVENTOR.
DONALD L. LILLY
BY MICHAEL E. MIKRUT
F. C. Sullivan
ATTORNEY

June 13, 1967 D. L. LILLY ET AL 3,325,632

DATA STORAGE TECHNIQUES

Filed July 12, 1961 4 Sheets-Sheet 4

INVENTOR.
DONALD L. LILLY
BY MICHAEL E. MIKRUT

ATTORNEY

United States Patent Office 3,325,632

Patented June 13, 1967

3,325,632

DATA STORAGE TECHNIQUES

Donald L. Lilly, Chelmsford, and Michael E. Mikrut, Littleton, Mass., assignors to Sylvania Electric Products Inc., a corporation of Delaware Filed July 12, 1961, Ser. No. 123,492
4 Claims. (Cl. 235—61.12)

This invention is concerned with electronic data processing techniques and particularly with the storage and reproduction of data or intelligence.

Existing methods and media for performing the function of storing and reproducing data in electronic processing systems may be divided into three major categories:

First, a commonly used technique is storage in binary bit form on cards or tapes which are punched with holes in coded area locations in conformance with signal inputs. The data thus stored is read by detecting the make and break of electrical contacts or the passage of light through the punched holes.

Second, magnetizable tapes, drums or discs are employed to record and reproduce data in binary bit format. These devices comprise a base material covered by a flux retentive magnetizable layer which is scanned by a magnetic reading or writing head. A bit of information is stored by energizing the head with an alternating or direct current signal whose amplitude, polarity and timing are determined by the data to be stored. To accomplish this, the head is provided with a gap in which flux is created proportional to input current signals and magnetizes the tape, etc. accordingly. The gap is also used to detect changes in intensity of magnetization on the record during a read operation.

Third, a method for storage of digital information has been proposed by E. W. C. Russell in United States Patent 2,547,838. This method employs a magnetic record card having its record area covered by an evenly magnetized material interrupted at selected intervals by spaces voided of the magnetic coating by chemical means or punching through the document. Reading heads are provided whereby such voids in the magnetic film can be detected.

The first method has been widely used, but has the disadvantages of bulk and weight of equipment, a mutilated document which interferes with human readability, limitations in processing, speed, and high power requirements. It also suffers because its cards or tape have a tendency to tear along the perforations formed by their punched holes, particularly if high processing speeds are attempted. Moreover, the record blank must be arrested in motion during the punching operation at a cost in system processing speed, and attempting to increase punching speeds is extremely hard on punch and die equipment due to oxide abrasion.

The second method has the disadvantage of its stored information being subject to erasure.

The third method provides a permanent record which is not perforated when the chemical etching technique is used. The chemical etching method, however, suffers disadvantages in recording speed and in a requirement for cumbersome etching equipment while the punching technique used by Russell suffers from the same disadvantages as the punched card method.

In addition, the three aforementioned methods all require that information be stored and read in separate operations. Consequently, there is always a possibility that data has been imperfectly recorded so that it does not read-out exactly as it was written-in; and the only way of insuring that this has not happened is to perform a subsequent read and check operation after the initial write-in of data. This is costly in time and equipment and is not as reliable as a simultaneous recording and reading operation would be if these present state-of-the-art techniques were capable of performing it.

Accordingly, a primary object of the present invention is to provide a method for recording and reproducing information which enjoys permanence of storage, a non-perforated document and simultaneous record-read capability. Another object is to provide an improved data recording technique. A still further object is to provide a recording system which features high density and permanently recorded data, high recording and reading speeds, less processing mechanism, and lower power consumption.

These and other related objects are accomplished in one illustrative embodiment of the invention which will be described as featuring a tape, card or other record covered by a magnetizable material, and an indenting tool or stylus selectively operable by pulsing an electromagnet, so that when a signal is applied to the electromagnet, the stylus is caused to distort the magnetizable film on the record. These distortions on the highly permeable magnetic layer may then be read by conventional flux, permeability, or velocity reading apparatus. The record substrate is not pierced through by the stylus. Consequently, it is less vulnerable to tearing and more useful for supporting human readable information. Also, a reading head may be located on the opposite side of the record from the recording stylus to read data as it is written and thus insure accuracy of the recording operation.

Other objects, features, and modifications will be apparent from the following description of illustrative embodiments of the invention and reference to the accompanying drawings wherein.

Figure 1A:
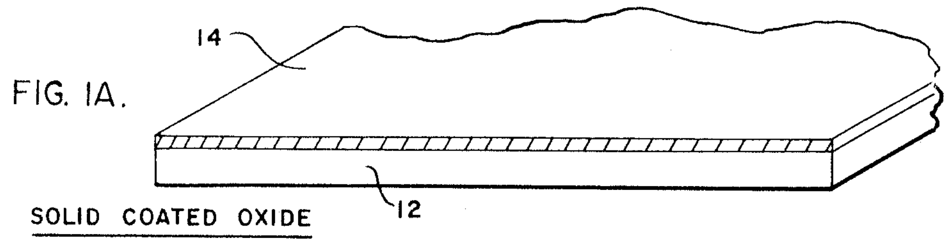
FIGS. 1A–1D are are perspective representations of various card or tape record blanks before information is stored upon them.
Figure 1B:
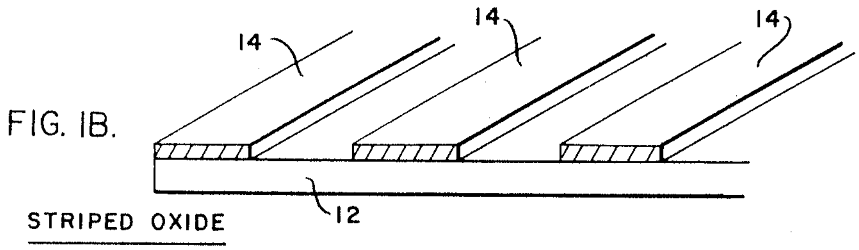
Figure 1C:
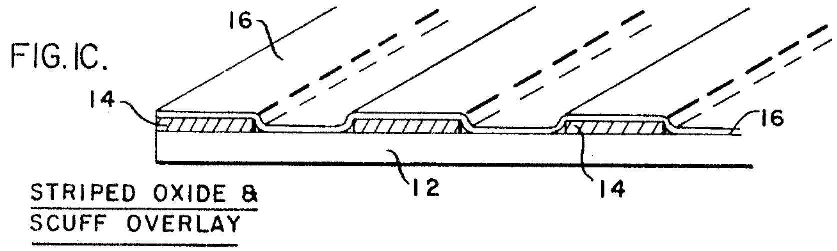
Figure 2:
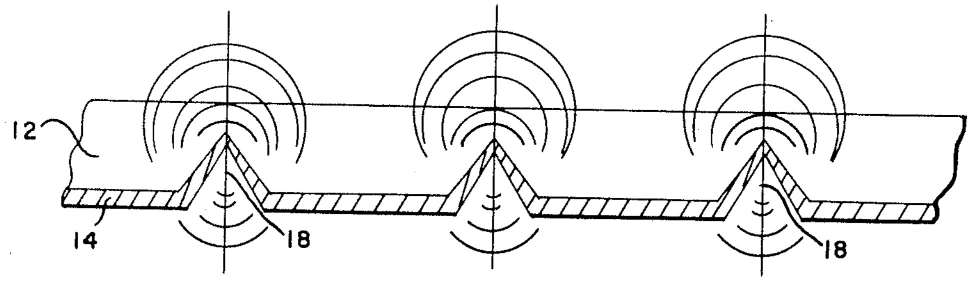
FIG. 2 is a representation of the card or tape record after the magnetic layer has been depressed into the base material in an alternative method of recording data.
Figure 3:
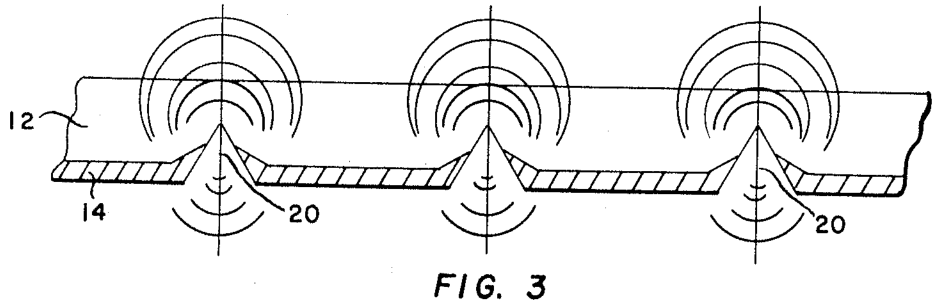
FIG. 3 is a representation of a card or tape record after data has been stored by rupturing a magnetic layer of material.

FIGS. 1A–1D show various forms of record blanks which may be employed in utilizing this invention. In general, these records each comprise a suitable base material 12 such as paper, cardboard, plastic, etc. upon which a magnetic material 14 such as an iron oxide film has been superposed by a laminating or printing process. FIG. 1A shows the complete surface area of the record oxide coated and FIGS. 1B and 1C show the magnetic coating applied in linear stripes. As shown in FIGS. 2 and 3, data is permanently recorded on these records in binary bit form by indenting or rupturing the magnetic coating at given locations to produce signal areas of fringing magnetic flux.

If the record blank of FIG. 1A is used, data may be recorded in any desired physical pattern on the broadly continuous magnetic area 14. On the blanks of FIGS. 1B 1C, however, recording is accomplished in parallel linear tracks which may represent individual channels in a parallel recording system. These lines may, for example, be spaced ten tracks to the inch and the mechanical depressions which record data to be recorded may have densities of the order of 100 bits per inch.

A protective scuff coating 16 may be applied to the record as shown in FIG. 1C. This coating may be a wear-resistant plastic material and can be applied by spraying or lamination either before or after recording. Also, in the patterned oxide configurations of FIGS. 1B and 1C advantage may be taken of the fact that the protective coating can adhere to the base material in the area between stripes, thus making it possible to select material 14 for optimum magnetic characteristics with less concern for adhesive bonding qualities.

Figure 1D:
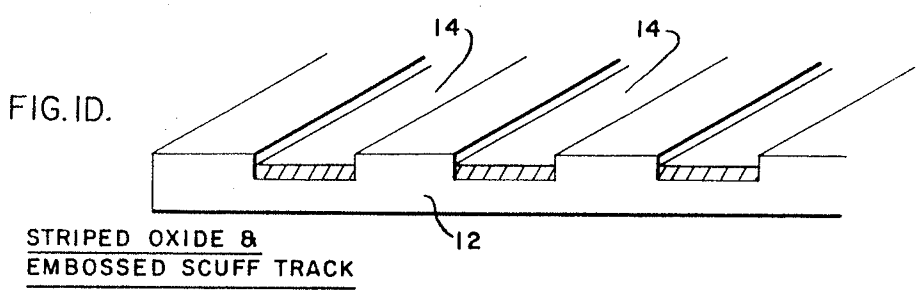

In the configuration of FIG. 1D, the record is formed with depressions in the surface of the supporting material 12 to accommodate deposits of the magnetic material 14. These depressions may be formed by calendering or any other suitable process, and the embossed area between them will provide protective scuff tracks.

Other forms of permanent record in addition to cards, tapes, etc., may be drums or discs with a magnetic surface contoured in accordance with data to be recorded.

FIG. 2 shows an encoded portion of the card or tape section, with depressed distortions 18 visible in the track 14 of magnetic material. Each of these indented depressions represents an encoded or stored bit of information, a distortion 18, for example, in a given area being a "1" in the binary number system and a lack of distortion in that area being a "0."

FIG. 3 is a representation of an alternative method of storing information wherein the magnetic layer 14 is depressed into the base material 12 thereby causing a void 20 in the magnetic layer 14. The difference between these two recording techniques is that in FIG. 2, the magnetic material is depressed and constricted, whereas in FIG. 3 it is depressed beyond the point of rupture. Either type of indented distortion may be detected by a conventional magnetic reading head.

Figure 4:
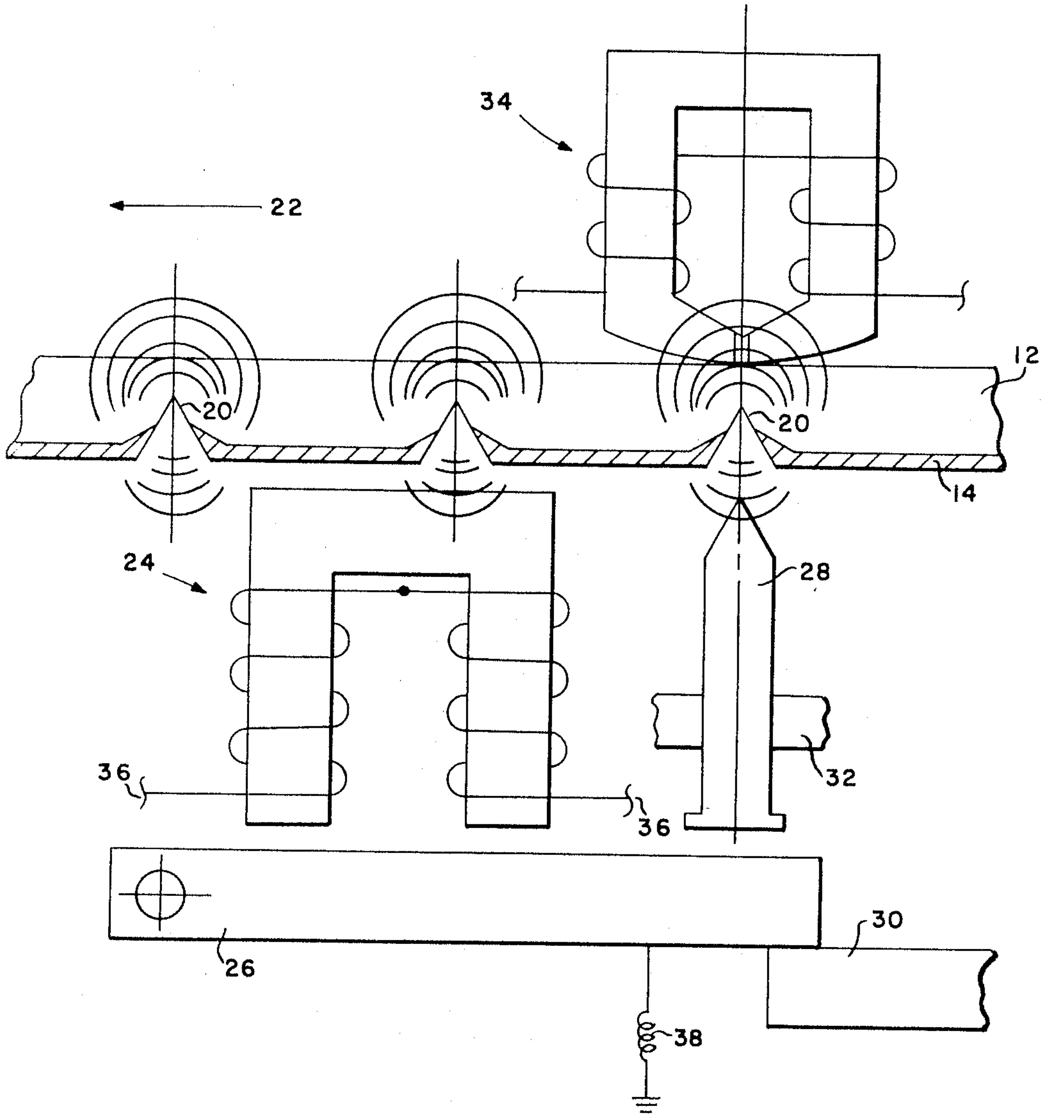
FIG. 4 is a schematic representation of the card or tape record and associated recording and reading apparatus.

FIG. 4 is a schematic representation of a record being transported in direction 22 and a recording mechanism including an electromagnet 24, a lever arm 26, and an indenting tool or stylus 28 movable between stops 30 and 32. A conventional reading head 34 is shown in position to read the flux fringing gaps 20.

The aforementioned recording and playback configuration and record medium operate as follows: A record is transported in direction 22 and at predetermined intervals, under control of data to be recorded, a direct-current signal is applied to terminals 36 so that the electromagnet 24 operates lever 26 to move stylus 28 against the force of spring 38 so that a suitable distortion results in the magnetized coating 14. This distortion may be a constriction as shown in FIG. 2 or a rupture as shown in FIG. 3. In either case, it produces fringe flux, a difference in permeability, and other changes in properties of the magnetic coating 14. These changes, especially changes in flux density, are recognizable by a reading head operating in a conventional manner. Publications such as "Magnetic Recording Techniques" by Stewart, published by McGraw-Hill in 1958 may be consulted for descriptions of various reading heads which may be used with the applicants' method of recording and their record medium.

Figure 5:
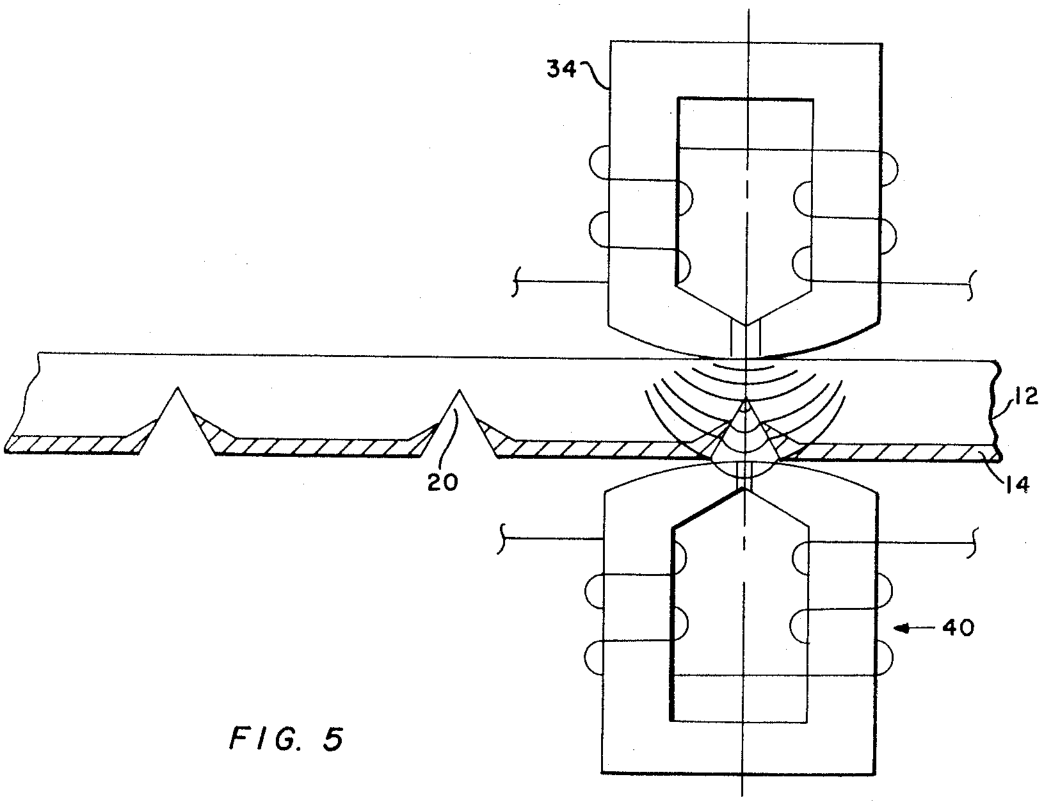
FIG. 5 is a schematic representation of apparatus performing a flux charged reading operation in accordance with the invention.

In order to strengthen signal output during the reading operation, the apparatus of FIG. 5 may be employed wherein an electromagnet 40 flux charges the material 14 as it is scanned by reader 34. Also, a permanent magnet or permanently charged magnetic film may be used for this purpose. Applicants' method is compatible with or may be substituted for erasable storage of the same magnetic record. For instance, a card or tape may be prepared with magnetizable strips covering the base material or a magnetizable layer covering the base material. Recording may then be accomplished in an erasable manner by appropriately magnetizing discrete areas of magnetizable layer or strips, with the magnetized portions representing binary "1" and the non-magnetized portions representing binary "0." Alternatively, the same record medium, having a magnetizable layer or magnetizable strips may be used for non-erasable storage by mechanically distorting the magnetizable layer with recording apparatus such as that shown in FIG. 4. The magnetizable layer may be magnetized before reading, or even before recording.

In a combination of permanent and erasable techniques, a record, e.g., a charge account, could be prepared with identification data permanently encoded and changeable data such as monthly entries and balances erasably recorded. Both types of record may be then read by the same sensing head.

Figure 6:
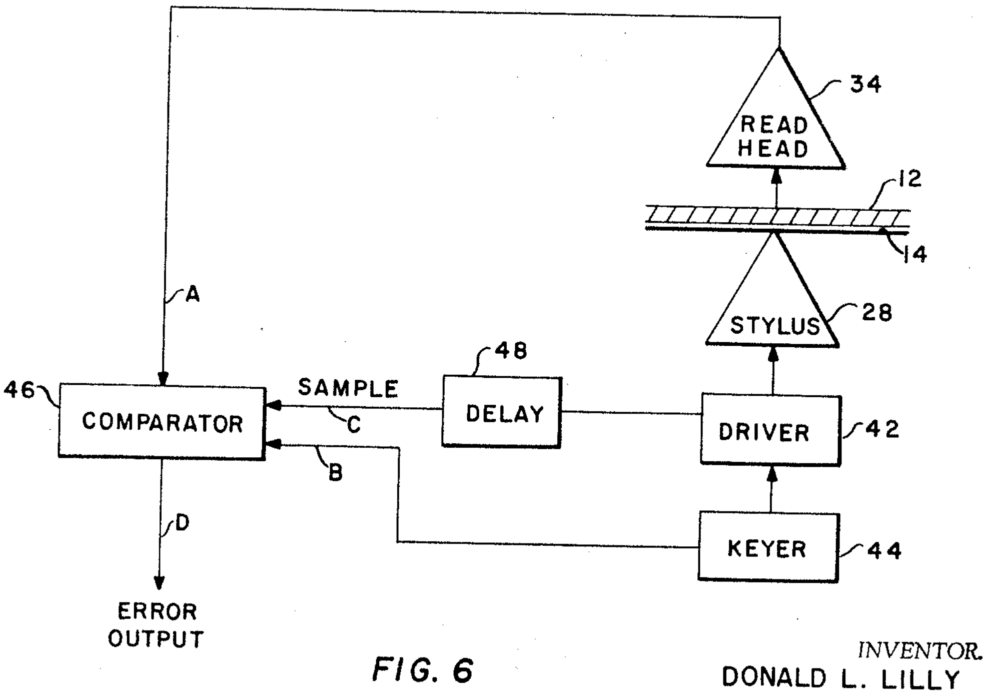
FIG. 6 is a block diagram of a simultaneous record-read system.

The record medium 12 and recording apparatus may also be used for providing simultaneous reading and recording with apparatus of the type shown in FIGS. 4 and 6. This may be accomplished by having the conventional read apparatus 34 on the opposite side of the tape or card 12 from the recording stylus 28. This type of arrangement is particularly beneficial to check whether or not the correct information has been stored in the record without destruction of the information.

Referring to FIG. 6, a driver 42 is operated by a keyer 44 to impress mechanical distortions into the magnetic material 14 on a record medium 12. The magnetic effect of these impressions, as soon as they are formed, is sensed by a reading head 34 which transmits signal indications of its readings to a comparator circuit 46.

The comparator 46 also has inputs B and C respectively, from the keyer 44 and the driver 42 (through a delay 48) and it operates as a coincidence gate giving an output error signal on conductor D whenever the signal input A from reading head 28 does not conform with the signal input B from keyer 44.

The operation of this system features the use of comparator 46 as a coincidence gate performing the following logical functions:

(1) $ABC=\overline{D}$ (2) $\overline{A}BC=D$ (3) $A\overline{B}C=D$ (4) $A\overline{B}\overline{C}=D$ (5) $\overline{A}B\overline{C}=D$ Where A and B respectively represent binary "1" signals, $\overline{A}$ and $\overline{B}$ represent binary "0" signals, C represents a gating input from the stylus driver operating mechanism to indicate that the stylus has operated to impress a binary "1" into the record, and D indicates a signal output to an appropriate mechanism to indicate that an error has been detected.

Thus, when the keyer 44 indicates that a binary "1" is to be printed, it transmits a signal level B to comparator 46 and energizes the recording quill of driver 42 to deform the magnetic track 14 of record 12. This deformation is sensed to transmit a signal A to the comparator 46 and a gating signal C is produced at the comparator input, via a delay 48, which may be artificially introduced or inherent in the system provided only that it coincide in time with signal A. This combination of signals satisfies Equation 1 above and inhibits an error signal D from being produced. On the other hand, if the reader 34 did not sense that a binary "1" had been recorded in response to command from the keyer 44 and driver 42, Equation 2 would be satisfied and an error signal D would be produced.

Similarly, if the keyer output is $\overline{B}$, indicating that no binary "1" should be written and the head 34 senses a "1" signal, A, which either coincides with a faulty operation of the quill, C, to satisfy Equation 3 or occurs because of a defect in the record medium or for some other reason without operation of the quill, $\overline{C}$, to satisfy Equation 4, an error signal, D, results. It will be appreciated that this amounts to a certification of the tape or other record medium as having no accidential stored signals in critical areas due to flaws, etc. Also, if the keyer 44 indicates that a binary "1" should be recorded, B, and neither the driver 42 nor the reader 31 respond, i.e., $\overline{C}$ and $\overline{A}$ respectively, Equation 5 indicates an error, D.

The arrangement shown in FIGS. 4–6 demonstrates operation of a single recording stylus 28, i.e., a single quill to record a single bit of data. In practical equipments the apparatus shown may be duplicated in parallel for as many recording quills as are desired to be operated simultaneously for parallel recording of a multi bit data word.

This type of simultaneous reading and recording cannot be accomplished in the first of the existing methods outlined in the introduction of this application; for if the record medium is a punched card or tape, the punched out portion cannot be disposed of before contacts close to read the information stored by the hole punching.

The second method suggested in the introduction for recording and reading information cannot be used for simultaneous recording and reading because the signal is attenuated by the shunting effect of the magnetic layer and spacing loss represented by the thickness of the base material. Moreover, these present state-of-the-art techniques cannot use the flux charging apparatus of FIG. 5 to enhance signal playback because this would erase the magnetically stored data.

The third method mentioned in the introduction is not amendable to simultaneous recording and reading because of the inherent speed disadvantage of chemical removal of magnetized information or the punching technique for removal of magnetized portions of the record medium.

The present invention is particularly suitable for providing man-readable information interleaved between magnetic lines or printed on the opposite side of the record medium 12 from the magnetic layer 14, whereas punched cards have both sides of the record medium so distorted that it becomes difficult for the human eye to read from it.

The invention has been described with reference to several embodiments, but is not limited by such descriptions. For example, the distortions on the medium can be caused by other electronic, pneumatic, or mechanical devices than the electromagnetically operated tools shown and the magnetic areas 14 may be arranged in different pattern formats instead of lines. Also, data may be encoded by operating the recording quills at one rate of speed and may be read while passing the records under a reading head at a different rate. These and other features, modifications and embodiments of the invention are all within the scope of the following claims.

What is claimed is:

1. A record of permanently stored magnetically sensible binary coded data and capable of bearing man-readable information which is not obliterated by the coded data, said record comprising, a layer of nonmagnetic material having formed on one surface thereof a uniform coating of magnetizable material, and a plurality of noncontiguous areas in the exposed surface of said coating in a pattern representative of stored binary data, each of said noncontiguous areas being a depression of substantially uniform depth in said magnetizable material extending into but not through said nonmagnetic layer to produce fringing magnetic flux in each of said areas.

2. A record of permanently stored magnetically sensible binary coded data and capable of bearing man-readable information which is not obliterated by the coded data, said record comprising, a layer of nonmagnetic material having formed on one surface thereof a uniform coating of magnetizable material, and a plurality of noncontiguous indented areas of substantially uniform depth in the exposed surface of said coating in a pattern representative of stored binary data, each of said areas being separated from adjacent areas by unindented portions of said coating, and each of said areas providing magnetically sensible fringing magnetic flux.

3. A record of permanently stored magnetically sensible binary coded data and capable of bearing man-readable information which is not obliterated by the coded data, said record comprising, a layer of nonmagnetic material, a coating of magnetizable material of substantially uniform thickness formed on one surface of said nonmagnetic layer, and a plurality of noncontiguous indentations in the exposed surface of said coating extending to a substantially uniform depth into but not through said nonmagnetic layer to produce flux fringing in the region of said indentations which is magnetically sensible to identify the stored data.

4. A record of permanently stored magnetically sensible binary coded data and capable of bearing man-readable information which is not obliterated by the coded data, said record comprising, a nonmagnetic substrate layer, a layer of magnetizable material of substantially uniform thickness, said layer of magnetizable material having in the exposed surface thereof a plurality of noncontiguous depressions in a pattern representative of said data, each depression extending to a substantially uniform depth below the surface of said magnetizable layer and into said substrate layer to produce flux fringing which is magnetically sensible to identify the stored data.

References Cited

UNITED STATES PATENTS

| | | | |
|---|---|---|---|
| 934,601 | 9/1909 | Fuller | 274—41.4 |
| 1,853,443 | 4/1932 | Maul | 235—61.12 |
| 2,224,646 | 12/1940 | Friedman et al. | 235—61.12 |
| 2,493,847 | 1/1950 | Ayres | 235—61.12 |
| 2,508,953 | 5/1950 | Knutsen | 235—61.12 |
| 2,511,121 | 6/1950 | Murphy | 346—74 |
| 2,547,838 | 4/1951 | Russell | 235—61.12 |
| 2,559,505 | 7/1951 | Hillier | 179—100.2 |
| 2,614,632 | 10/1952 | Clos | 164—113 |
| 2,672,395 | 3/1954 | Lewis | 346—74 |
| 2,700,755 | 1/1955 | Burkhart | 340—149 |
| 2,797,402 | 6/1957 | Duffey | 340—174 |
| 2,844,434 | 7/1958 | Beard | 346—74 |
| 2,844,665 | 7/1958 | Mann | 179—100.2 |
| 2,870,430 | 1/1959 | Hancock | 340—149 |
| 2,914,746 | 11/1959 | James. | |
| 2,953,300 | 9/1960 | Obrian | 235—61.12 |
| 3,045,218 | 7/1962 | Brand. | |
| 3,096,511 | 7/1963 | Taras | 340—146.1 X |

MAYNARD R. WILBUR, *Primary Examiner.*

WALTER W. BURNS, Jr., MALCOLM A. MORRISON, *Examiners.*

P. J. HIRSCHKOP, W. S. POOLE, R. E. COUNCIL, *Assistant Examiners.*